United States Patent [19]
Mayer et al.

[11] 4,080,597
[45] Mar. 21, 1978

[54] GAS DISPLAY PANEL HAVING PLANAR CONDUCTORS

[75] Inventors: William Norman Mayer, White Bear Lake; Richard Karl Kirchner, Bloomington; Nicholas Cleanthis Andreadakis, White Bear Lake, all of Minn.

[73] Assignee: Modern Controls, Inc., Minneapolis, Minn.

[21] Appl. No.: 706,071

[22] Filed: Jul. 16, 1976

[51] Int. Cl.² .................................... G06F 3/14

[52] U.S. Cl. .................... 340/324 M; 315/84.6; 313/208; 313/217; 315/169 TV; 313/198; 313/220; 340/343

[58] Field of Search ............... 340/168 S, 324 M, 343; 315/84.6, 169 R, 169 TV; 313/208, 217, 220, 198, 188, 204, 197, 201, 484, 514

[56] References Cited

U.S. PATENT DOCUMENTS

| | | | |
|---|---|---|---|
| 2,847,615 | 8/1958 | Engelbart | 313/201 |
| 3,775,764 | 11/1973 | Gaur | 340/324 M |
| 3,795,908 | 3/1974 | McDowell et al. | 340/324 M |
| 3,911,422 | 10/1975 | McDowell et al. | 340/324 M |
| 3,964,050 | 6/1976 | Mayer | 313/217 |

*Primary Examiner*—Marshall M. Curtis

[57] ABSTRACT

Apparatus for providing a visual information screen of the type formed from a plurality of gas cells wherein electrical voltages are capacitively coupled to selected cells to cause gas ignition and subsequent light emisson. The present invention comprises an improvement over prior art devices in that it utilizes a single plane of parallel spaced conductors to ignite gas in channels perpendicularly aligned with respect to the conductors and located above the conductor plane, wherein a gas cell is defined by the region within a channel between two parallel conductors, and further in that it utilizes a special conductor geometry to initially ignite a gas cell and introduce data into the screen with only a single voltage-magnitude source.

28 Claims, 9 Drawing Figures

FIG. 1
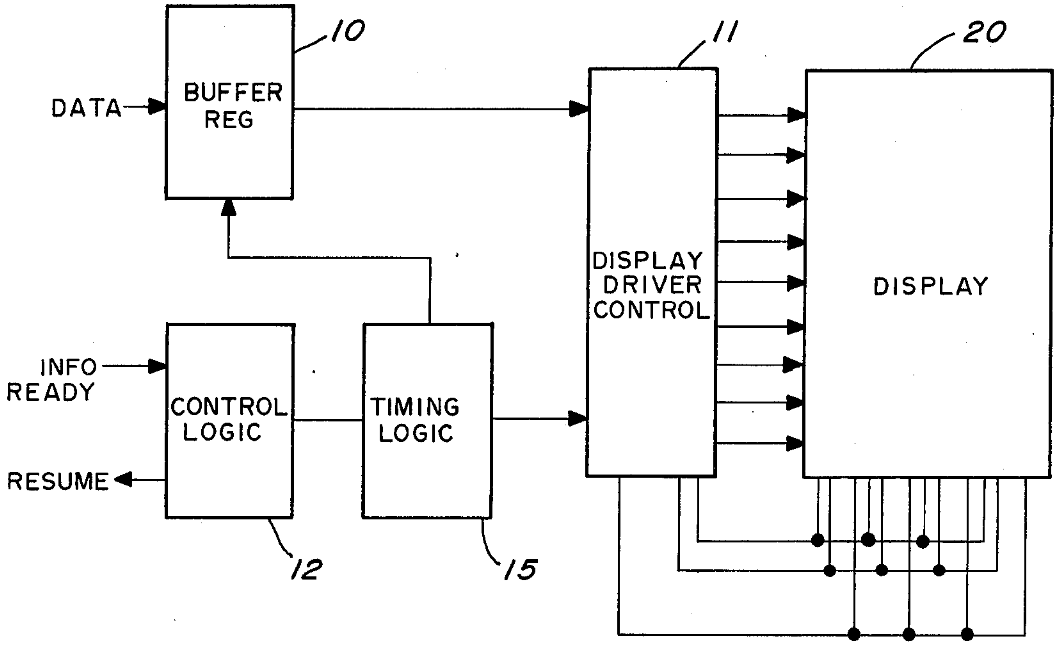
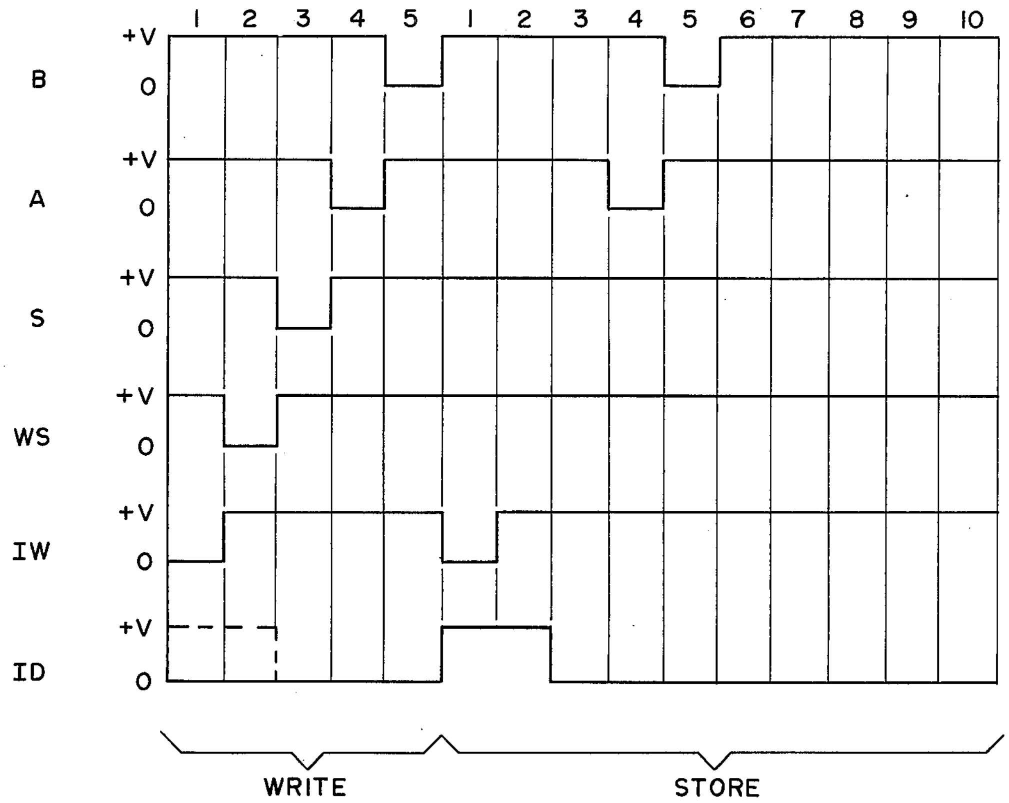
FIG. 2

GAS DISPLAY PANEL HAVING PLANAR CONDUCTORS

BACKGROUND OF THE INVENTION

This invention relates to visual display screens, and more particularly to display screens having a plurality of gas cells arranged across a plane in close capacitive proximity to electrical conductors. The selective application of voltages to the conductors causes gas ignition to occur in the cells, and further enables cell ignition to be transferred to adjacent cells under a unique combination of electrical signal timing and conductor physical spacing and geometry.

It has long been known that a gas cell can be fired into ignition upon the application of a suitable voltage across the cell. Neon lamps have used this phenomena to provide visual indicators driven by electrical circuitry. It has further been known that the separation of the voltage conductors from the gas cell by a dielectric medium such as glass causes gas cell ignition which fairly rapidly extinguishes when the free electrons in the cell accumulate along the inner dielectric surface to create an electric field opposing the field created by the voltage conductor. However, if the polarity is suddenly reversed across the voltage conductors, the dielectric electron accumulation acts in a voltage aiding sense with the field created by the reversed polarity voltages to cause a repeated cell ignition.

A 1962 publication in the *Journal of Applied Physics* entitled "Electrical Breakdown of Argon in Glass Cells with External Electrodes at Constant and at 60 Cycle Alternating Potential", by Bakkal and Loeb, describes this cell dielectric phenomena in considerable detail. The discovery disclosed by this publication is that, once sufficient voltage has been applied to initially ignite a gas cell, subsequent reversed polarity voltage pulses may be of lesser magnitude to sustain the cell ignition because of the additive effect created by the electron accumulation on the inner dielectric surface. This phenomena has been utilized to derive a number of prior art display devices, many of them utilizing gas cells arranged in a matrix with conductors, such as U.S. Pat. No. 2,933,648, Bentley; No. 2,925,530, Engelbart; No. 2,984,765, Engelbart; No. 3,340,524, Renauldi; and No. 3,559,190, Bitzer. Each of these patents disclose particular kinds of electrical drive systems for activating gas cells constructed according to the teachings of the *Journal of Applied Physics* publication.

A general understanding of the basic operation of a gas cell according to the phenomena discovered and disclosed in 1962 is necessary in order to fully understand the present invention. This phenomena presupposes a gas filled cavity having electrical conductors closely aligned and capacitively coupled, preferably by means of a glass dielectric. When the voltage potential between two lines disposed in close proximity to the gas filled cavity is made sufficiently high, a breakdown will occur in the gas space in the region immediately between the respective conductors and adjacent dielectric material. When this breakdown occurs the gas space contains movable charges, both electrons and positively charged ions, which are generated by the various physical processes responsible for the breakdown. The electrons move toward the most positive surface, and the ions move in the opposite direction towards the lowest potential surface. The electrons are by far the most mobile and therefore move with transit times of $10^3$ – $10^4$ less than the transit times of the ions. The electrons tend to accumulate on the dielectric surface over the positively charged conductor and the ions tend to accumulate on the dielectric surface over the negatively charged conductor.

The physical movement of these charges constitutes a current, and since the dielectric medium will not pass this current a voltage charge is developed by charge movement and accumulation. The accumulation of charges gives rise to a potential across the gas space which is developed in opposition to the applied voltage potential, and this opposition potential increases as the charges build up on the dielectric surface. This opposing potential eventually becomes high enough to extinguish the cell illumination, and since the electrons have much greater mobility their charge accumulation is primarily responsible for the cell extinguishing. Typical times required for sufficient electron accumulation to extinguish the cell are from $10^{-8}$ to $10^{-7}$ seconds, and at the point of cell extinction, the electrons have effectively been swept out of the gas space, whereas the positively charged ions have barely begun to move. The positively charged ions create a positive space charge in the gas space which will continue to migrate toward the negative voltage terminal if the voltage is continually applied to the voltage conductor. After a sufficient additional time the positive ions drift to the dielectric surface over the negative conductor and create a surface charge on this surface which is positive and in opposition to the negative voltage of the adjacent conductor. If the applied voltage is then removed, the respective positive and negatively charged dielectric surfaces maintain a field across the gas space in a direction which is opposed to the direction of the originally applied field. The magnitude of this field is the vector sum of the effect caused by the two oppositely charged dielectric surfaces.

If the voltage applied to the conductors is subsequently reversed in polarity it will be discovered that a much lower voltage magnitude is required to cause cell ignition than was the case in the first application of voltage to the conductors. This is because the subsequent reversed voltage polarity has the internal electric field, developed by the charges on the dielectric surfaces, acting in a voltage-aiding sense to cause a new gas breakdown and subsequent ignition. The foregoing process may be repeated with subsequent low voltage polarity reversals so that illumination of the cell is maintained under lower voltage parameters than were required for initial cell ignition. This phenomena has variously been referred to as the "wall charge" phenomena, cell "memory", and in other terms of art. The net result of the foregoing operation is that, for a given gas cell, the initial cell ignition potential requires the voltage of one predetermined magnitude and subsequent gas ignition potentials may be predetermined lower voltage signals.

SUMMARY OF THE INVENTION

The present invention utilizes the aforedescribed phenomena in combination with an approved apparatus for eliminating the necessity of requiring two voltage sources for initial cell ignition and subsequent cell ignition. The invention includes a novel physical geometry for a set of voltage conductors identifiable with a particular row of cells, which geometry enables cell ignition to be accomplished at the same voltage as is required to sustain ignition in other cells on the visual information screen. The apparatus utilizes a unique timing approach to the application of voltages to adjacent conductors to cause the physical transfer or shifting of a cell ignition to an adjacent cell under the timed application of a single applied voltage. A row of pilot cells is arranged along the edge of the visual information screen to constantly provide a source of gaseous ignition, and this gas ignition is time-shifted into adjacent cells on the screen through the application of sequential timing voltages to adjacent parallel conductors in a manner which will permit the visual display of any pattern of alphanumeric or other information displayed across the entire face of the screen. The invention includes a means for selectively inhibiting the pilot cell ignition whenever a non-illuminated cell is desired to be placed on the screen.

BRIEF DESCRIPTION OF THE DRAWINGS

A preferred embodiment of the present invention is disclosed herein, with reference to the drawings, in which:

FIG. 1 is a block diagram of the system;

FIG. 2 is a timing diagram for controlling the electrical signals utilized in the system;

DETAILED DESCRIPTION OF THE DRAWINGS

Figure 3:
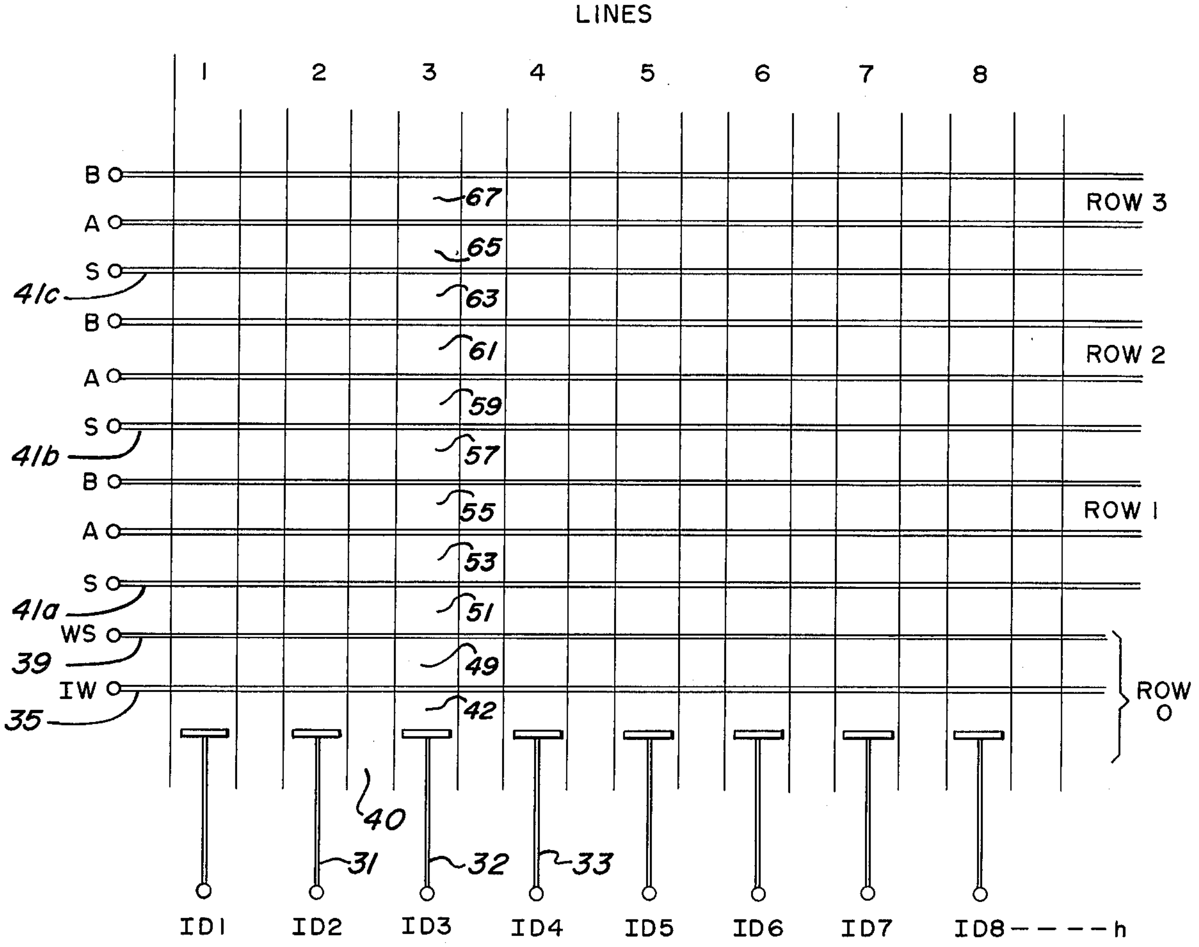
FIG. 3 is a simplified diagram showing the cell conductors.

The present invention is most advantageously used in conjunction with a digital keyboard or other digital communication device. It is adapted, through circuits well known in the art and not disclosed herein, for connection to a digital electrical interface wherein alphanumeric or other data is encoded into binary signals and transmitted to binary registers which form a part of the present invention. If the invention is used in conjunction with a digital computer processor it may be readily adapted to provide the necessary transmission signals for initiating and controlling the transmission of binary data from the processor to the registers of the present invention. Such data transmission and control apparatus is well known in the art and is not further disclosed.

FIG. 1 illustrates, in block diagram form, the digital interface between the present invention and an external transmission device. Data, in the form of binary electrical signals, is transmitted from a computer, keyboard or other transmission device into a buffer register 10. This data is representative of alphanumeric information to be displayed on the visual information screen. The data is then fed into a display driver control network 11 under control of a predetermined set of timing signals from timing logic 15. The timing control signals are also coupled into the display driver control network 11 for purposes of controlling the timing necessary within this network. The plurality of controlled outputs are then transmitted from the display driver control network to the visual information screen 20 for igniting selected gas discharge cells to form a pattern of discharges representative of the alphanumeric information. A suitable control logic network 12 receives and generates the necessary control signals for regulating the transmission of the binary electrical signals between buffer register 10 and the external transmission device. Networks of this type are well known in the art and need not be further disclosed herein.

FIG. 2 illustrates the timing signals which are used to control the sequential inputting of alphanumeric information onto the visual information screen. Two phase signals, hereinafter referred to as "A" and "B" signals, are the primary phase control signals for controlling the serial ignition and storage on the face of the screen. In addition to the A and B signals, a step ahead (S) signal, a word select (WS) signal, an input word (IW) signal, and an input data (ID) signal are used for the purpose of initially igniting selected gas cells and for storing the cell ignition states of those cells previously ignited. This combination of signals is utilized in two modes of operation: the WRITE mode utilizes these signals to introduce alphanumeric information onto the screen for the first time, and the STORE mode is utilized to keep the alphanumeric display present on the screen after it has been introduced. All of the signals on FIG. 2 appear in the relative time slots shown, i.e. the WRITE mode comprises five unique time slots during which the ID, IW, WS, S, A and B signals are utilized. The STORE mode comprises ten unique time slots during which the ID, IW, A and B signals are utilized. The frequency at which the STORE mode is operated primarily affects the average intensity of light which the human eye observes being emitted from the screen. STORE mode frequencies of from 5–100 kilohertz (kHz) provide adequate intensity levels for most purposes. In the preferred embodiment, the time duration of a particular time slot is 5 microseconds, so the WRITE mode of operation (write cycle) occurs over a 25 microsecond interval and the STORE mode of operation (store cycle) occurs over a 50 microsecond interval. The WRITE mode of operation may be initiated after any previous write cycle or after a store cycle of operation.

FIG. 3 shows a simplified diagrammatic representation of the cell conductors included in the visual information screen 20, wherein an array of horizontal parallel conductors is arranged across a glass bottom plate. Each of these conductors is identified by the electrical signal to which it is connected. For example, conductor 35 is an input word (IW) line, conductor 39 is a word select (WS) line, and conductors 41*a*, 41*b*, 41*c* are step ahead (S) lines.

A plurality of vertical input data (ID) conductors are arranged across the edge of the visual information screen to form a plurality of lines *l* . . . *n*. The intersection of each line with a conductor pair A, B represents a gas cell position, and these cell positions can be identified by a line and row location. For example, cell C13 is the cell found in line 1 and row 3. Isolating each cell line from adjacent cell lines is a glass insulating strip, such as strip 40 which separates and isolates line 2 from line 3, as well as isolating input conductor 31 from input conductor 32.

The input data (ID) signals are applied to the various input conductors arranged across the visual information screen. For example, signal ID2 is applied to input conductor 31 and signal ID3 is applied to input conductor 32. The ID1 . . . IDn signals are binary data signals representative of alphanumeric information to be displayed on the visual information screen. These signals are selectively controlled to provide either an ignited cell input or an unignited cell input at the respective line positions according to a predetermined and controlled timing arrangement provided by timing logic 15 and driver control 11. The input signals are initially translated into cell ignition states in each of the first row of cells (row 0), which is a row of cells outside the normal display area of the visual information screen. The cell ignition state is then serially shifted, in a manner to be hereinafter described, from row 0 to rows 1, 2, 3, etc. until the cell ignition state is properly located on the visual information screen.

Figure 4:
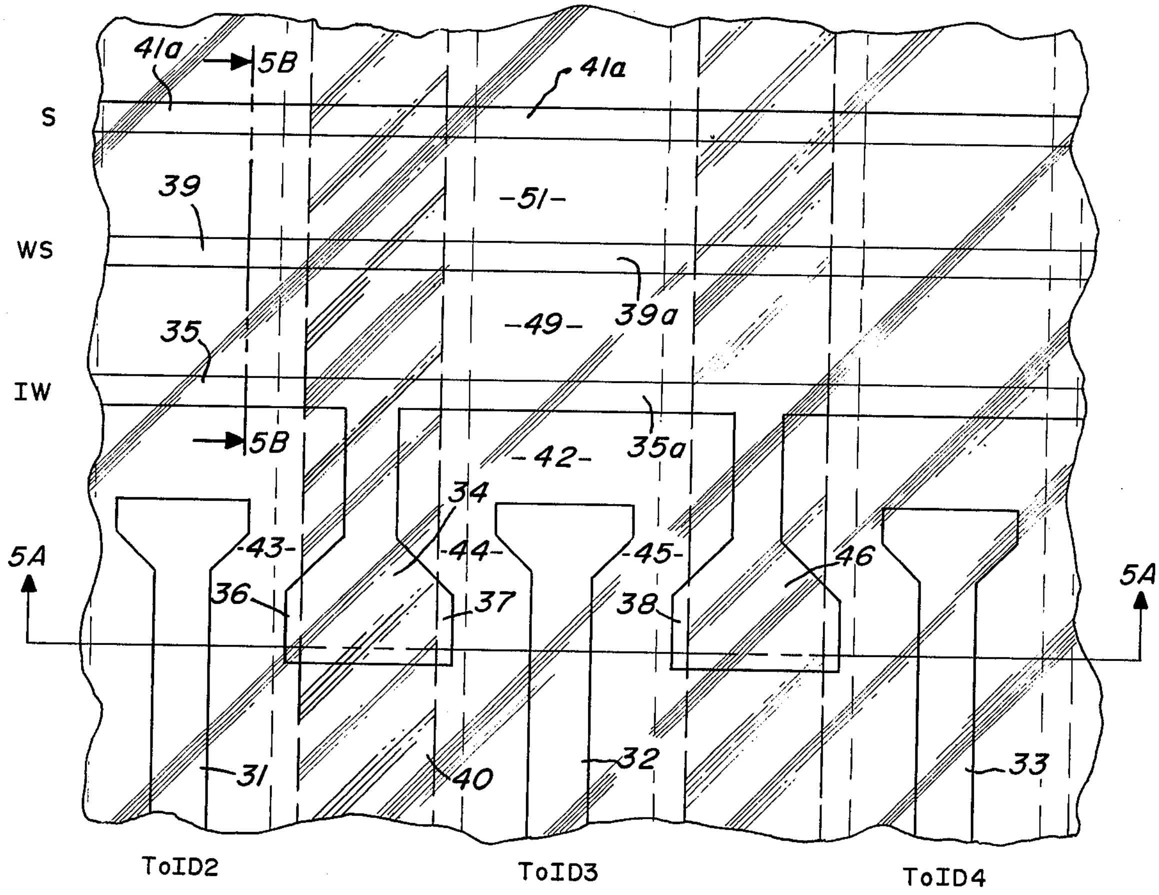
FIG. 4 is an expanded view of a portion of the cell conductors.

FIG. 4 shows a top partial view of the visual information screen. Three input conductors 31, 32, and 33 are shown, each having an identical physical shape. The input work (IW) conductor 35 has a plurality of pads projecting therefrom, each pad positioned intermediate a pair of input conductors. Glass insulating strip 40 partially overlays pad 34, leaving edge surfaces 36 and 37 exposed to the respective cell regions 43 and 44. Other similar insulating strips are likewise positioned over the other pads projecting from conductor 35.

A gas cell having three distinct regions is formed within the boundaries defined by the input word conductor 35 and its projecting pads, and an input data (ID) conductor. For example, a gas cell region 44 is found between input conductor 32 and edge surface 37 of pad 34; a second gas cell region 45 is found between input conductor 32 and edge surface 38 of pad 46; a third gas cell region 42 is found between input conductor 32 and word conductor segment 35*a*. The dynamic operation of these gas cell regions will be hereinafter described in conjunction with the operational description of the apparatus.

Gas cells are created in the regions intermediate all conductor pairs in the visual information screen. For example a gas cell 49 is formed intermediate conductors 35*a* and 39*a*, and a cell 51 is formed intermediate conductors 39*a* and 41*a*. The ignition or nonignition of gas in these gas cells depends upon the application of an appropriate voltage across the cell conductors and the state of electron and ion charge distribution on the dielectric surface bordering the cell.

Figure 5B:
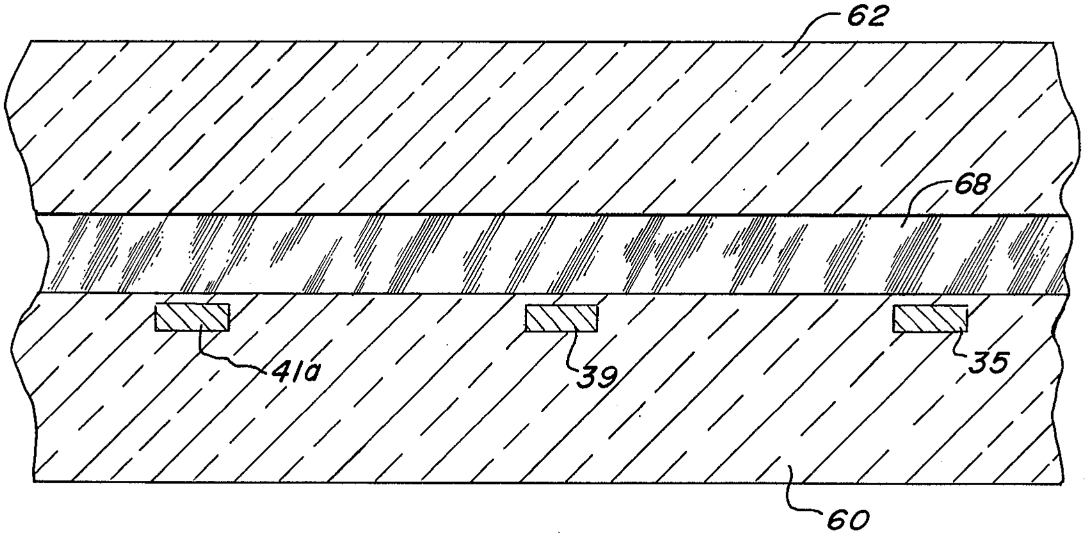
FIG. 5B is an end view taken along the lines 5B—5B in FIG. 4.
Figure 5A:
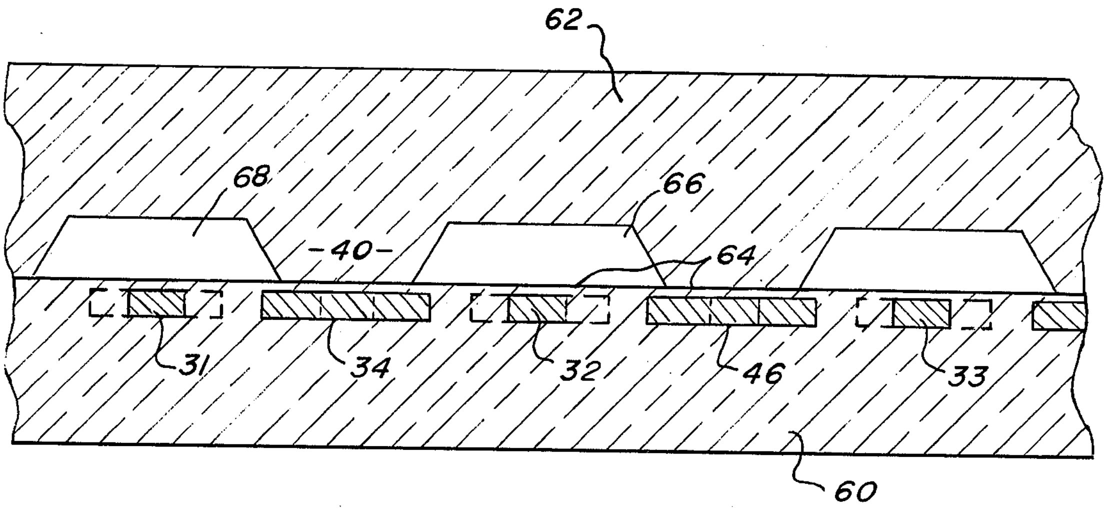
FIG. 5A is an end view taken along the lines 5A—5A in FIG. 4.

FIG. 5A shows a side view of the visual information screen taken along the lines 5A—5A of FIG. 4. The screen comprises a glass bottom plate 60 which has a conductor pattern on its top surface. The screen further comprises a glass top plate 62 having therein a plurality of gas cell channels. Overlying the conductor pattern is a thin glass dielectric layer 64 which covers all conductors. The top and bottom plates may be bonded together through any of a number of known processes, and an appropriate inert gas is introduced into the gas cell channels. The foregoing construction provides a plurality of gas-filled channels, such as channel 66, which form the basis for the gas cells described herein.

It is important to note that glass dielectric layer 64 isolates the gas contained in channel 66 and all other channels from direct contact with any conductor. For example input conductor 32, edge surface 37 and edge surface 38 are each isolated from direct contact with channel 66. It is also important to note that if a voltage were applied between two conductors, say conductors 32 and 34, a surface charge would appear on the dielectric 64 surface opposite the respective conductors and inside channel 66. This dielectric surface charge will be described in greater detail in conjunction with the operational description of the invention.

FIG. 5B is an end view taken along the line 5B—5B in FIG. 4. Parallel conductors 35, 39, 41*a* and all other S, A and B conductors are shown on bottom plate 60. The thin glass dielectric layer 64 covers all conductors and isolates them from channel 68. Channel 68 is formed in top plate 62 and is filled with an inert gas such as neon which exhibit desirable visible illumination characteristics when broken down by the application of suitable voltages between adjacent conductor pairs.

The dielectric surface charge referred to herein is formed along the upper surface of glass layer 64 in the vicinity of the respective conductors. An effective gas cell region can be made to occur between any two conductors upon the application of suitable voltage, but particular cell regions are identified herein as cell 0, cell 1, etc. for purposes of explaining the operation of the preferred embodiment.

PILOT CELL OPERATION

In the following description, reference will be made to FIGS. 2-5 for an understanding of the principles of operation of the pilot cells referred to herein as row 0. This row of cells is the first row along the edge of the visual information screen, and is preferably isolated from view by a protective opaque strip. The function of the row 0 cells is to provide a pilot ignition cell for each line which is always in the ignition state and which may be selectively shifted into the respective lines whenever a particular cell ignition is desired. The cell ignition shifting process will be described hereafter.

Pilot cell ignition is assured in the present invention through the novel design of the row 0 cells, including the physical geometry of the ID conductors and the IW conductor. Referring to FIG. 4, the IW conductor 35 is shaped such that the spacing between an ID conductor (i.e. conductor 32) and the IW conductor is minimized across the gap 44 formed between conductor 32 and edge 37, and also across the gap 45 formed between conductor 32 and edge 38. This spacing is less than the spacing 42 between conductor 32 and conductor segment 35*a*, and effectively lowers the breakdown voltage across the smaller gaps necessary to cause breakdown of the gas in the cell. In effect, when the operating voltage is applied to the system the small gaps 44 and 45 break down to create a gas discharge which then spreads to region 42 to ignite the entire cell. Referring to FIG. 2, it can be seen that this breakdown can occur during time slot 1 in either the WRITE mode or the STORE mode of operation.

After a cell ignition in the pilot cell (row 0) has been shifted into the visual information screen it is necessary to reignite the pilot cell during the store cycle. Referring to FIG. 2, assume the voltage states of the conductors 32 and 35 are determined by the voltages at time slot 5 during the write cycle, wherein conductor 35 is at a positive voltage potential, and conductor 32 is at a 0 voltage potential. The net surface charges on the dielectric above the respective conductors are opposite these potentials, and therefore a net positive surface charge exists in the region above conductor 32 and net negative surface charges exists in the region above edge surface 37, edge surface 38 and conductor segment 35*a*.

During the first time slot of the store cycle, conductor 35 goes to ground voltage potential and conductor 32 goes to a +V voltage potential. This causes an accumulation of negative charges on the dielectric surface above conductor 32, and accumulation of positive voltage charges on the respective surfaces 37, 38, and 35*a*. At time slot 2 in the store cycle conductor 35*a* jumps to a +V potential. This potential, together with the aiding positive charges on edge surfaces 37 and 38, is sufficient to cause a gas breakdown in gaps 44 and 45 and to thereby reignite the gas in regions 44 and 45. At time slot 3 conductor 32 drops to 0 volts, and the accumulation of dielectric surface charges acts in a voltage-aiding sense to reignite this cell in the reverse voltage polarity. The cell becomes continually reignited over each of the subsequent store cycles.

The pilot cell must also become reignited during the write cycle when its previous ignition state has been serially transmitted into the adjacent line of cells. To explain this phenomena, it must be understood that the cell, at the beginning of the write cycle, is in a condition wherein conductor 32 is at a 0 volt potential and conductor 35 is at a +V potential. This causes a negative charge distribution to accumulate over the dielectric surface adjacent conductor 35, and edges 37 and 38, and causes a positive charge distribution to accumulate over conductor 32. At time slot 1 in the write cycle, conductor 35 drops to 0 volts and conductor 32 rises to +V volts. This causes a negative charge distribution to be developed on the dielectric surface adjacent conductor segment 35a, and edges 37 and 38.

At time slot 2 conductor 35 goes to +V volts and conductor 32 remains at +V volts. Conductor 39 drops to 0 volts. The previously positive accumulation of electric charge on the dielectric surface adjacent conductor 35 acts in a voltage-aiding sense, relative to conductor 39, to cause cell ignition in the cell region 49. This in turn results in an accumulation of positive electrical charge on the dielectric surface adjacent conductor 39*a* and an accumulation of negative electric charge on the dielectric surface adjacent conductor 35*a*. At this point the negative electric charge on the dielectric surface adjacent conductor 32 remains, for the aforementioned voltage changes have left conductor 35 at the same potential as conductor 32. However, the positive electric charges previously left on the dielectric surface over edge surface 37 and edge surface 38 still remain, and it is these surface charges which cause reignition of the pilot cell.

At time slot 3 in the write cycle the voltage on conductor 32 drops to 0 volts, creating a field between conductors 35 and 32. This field is reinforced by the surface charges on edge surface 37 and 38 so as to cause reignition of the gas in the cellular regions 44 and 45. This reignition results in an accumulation of negative electric charges on the dielectric surface above edges 37 and 38, and an accumulation of positive electric charges on the dielectric surface above conductor 32.

At the end of the write cycle conductor 32 is at a 0 volt potential and conductor 35 is at a +V potential, and the dielectric surface adjacent conductor 32 is positively charged and the dielectric surface adjacent conductor 35 (and edge surfaces 37 and 38) is negatively charged. This charge distribution corresponds to the charge distribution condition prior to the beginning of the write cycle, and the cycle is therefore complete. It should be noted that this same charge distribution condition exists at the end of the store cycle, so that at the end of either a write or store cycle the respective dielectric surfaces are always charged to this predetermined condition.

The foregoing operational description depends to a critical degree upon the relative geometry of conductor 32, conductor segment 35*a*, and edge surfaces 37 and 38. It has already been shown that the narrowed gap in regions 44 and 45 enhance cell ignition in these regions under lower voltage conditions that would otherwise be required. The respective surface areas are also important for proper operation to proceed. In any gas discharge cell the higher mobility of electrons in the gas field cause them to collect much more rapidly over the dielectric surfaces of interest, and the accumulation of these electrons causes the primary counterpotential that opposes the voltage field to turn the gas discharge off. The number of electrons necessary to accomplish this turn off is proportional to the area which must be charged, since the effective opposition voltage V is determined by the formula:

$$V = \frac{Q}{C} = \frac{1}{C} \cdot \int_{O}^{T} i dt \qquad \text{(a)}$$

In the above equation, C is directly proportional to surface area, the larger the area the more electrons it takes to charge that area to a given voltage potential. When this charge potential turns the gas discharge off the number of positively charged ions in the gas region is the same as the number of electrons which have been collected on the dielectric surface. If the applied voltage is retained on the respective conductors, these positively charged ions collect on the opposite voltage dielectric surface. If this surface differs in area from that which was charged by the electrons, then the voltage resulting from the collection on that different area surface will also differ, and this causes an inequality in the residual potential on the respective dielectric surface areas. The inequality in residual voltage potential can vary depending upon the polarity of the respective conductor voltages.

It is then desirable to have a structure wherein an inequality in residual potential cannot exist on the respective dielectric surfaces because this unreliably affects the statistical distribution of voltage charges and leads to uncertainty in cell ignition. It is therefore important to match the areas of the conductors as closely as possible in order to obtain the largest possible operating margins for ensuring cell ignition. For example, it is desirable to have the area of conductor segment 35*a* equal to the area of parallel conductor segment 39*a*. It is also desirable to have the area of conductor 32 equal the sum of the respective areas of conductor 35*a*, edge surface 37 and edge surface 38. However, since the foregoing description disclosed a further gas discharge condition between conductor 32 and edge surfaces 37 and 38 alone, it is also desirable to have the area of conductor 32 equal to the sum of the areas of edge surface 37 and 38. All of these conditions cannot be satisfied exactly, but can be fairly closely approximated if most of the surface areas associated with conductor 35*a*, edge surface 37 and edge surface 38, is concentrated on the two surfaces 37 and 38. For example, if we apply the following equations of area (A) to the respective conductor surfaces:

$$A_{35a} = A_{39a}$$

$$A_{32} = A_{37} + A_{38}$$

$$A_{35a} = 1/10\text{th } A_{32}$$

With the above restrictions on conductor areas we note that the only disparity in relative conductor area exists when we consider the gas discharge condition between conductor 32 and the sum of conductors 35*a,* 37, 38. Under this situation the following area (A) conditions exist:

$$A_{35a} + A_{37} + A_{38} = 1.1\, A_{32}$$

There is therefore a 10% inequality in area between conductor 32 and the other conductors in the pilot cell when the entire cell is in the ignition state. It has been found that this 10% inequality does not adversely affect operation, but lies well within the desirable operating margins for the apparatus.

WRITE MODE OF OPERATION

For purposes of explaining the operation of the apparatus during the WRITE mode of operation, it will be assumed that all pilot cells are initially ignited. New binary data, representative of alphanumeric display information, is introduced into the visual information screen during the WRITE mode of operation. This information is introduced via the input conductors such as conductor 32, by electrically generating the write cycle as shown on FIG. 2. If a binary "0" (no cell ignition) is to be introduced on conductor 32 the ID signal is clamped to 0 volts during time slots 1 and 2, and the other timing signals shown on FIG. 2 are generated in the predetermined illustrated sequence. If a binary "1" (cell ignition) is to be introduced on conductor 32 the ID signal is brought to +V volts during time slots 1 and 2, and the other timing signals are developed as shown on FIG. 2.

The writing of a binary "1" on the visual information screen, at conductor line 32, results when the write cycle is begun with the previous voltage on conductor 32 at 0 volts and the previous voltage on conductor 35 at +V volts. At time slot 1 conductor 32 goes to +V volts and conductor 35 goes to 0 volts. At time slot 2 the WS timing signal applies a zero volt potential to conductor 39, thereby causing an ignition to occur in the region labeled 49 in FIG. 4. The S signal immediately following in time slot 3 similarly applies a ground potential to conductor 41*a* and causes an ignition in region 51, but at the same time conductor 39 returns to +V volts and the ignition in region 49 is therefore extinguished. The net and apparent result of the process which occurs over time slots 1–3 is therefore a shifting of the cell ignition state from cell region 42 to cell region 49 to cell region 51. This ignition-shifting process continues during time slots 4 and 5 to move the cell ignition state to cell regions 53 and 55 respectively (see FIG. 3). Thereafter, successive write cycles will continue the shifting process to any desired cell region between any pair of A and B signal conductors.

Figure 6:
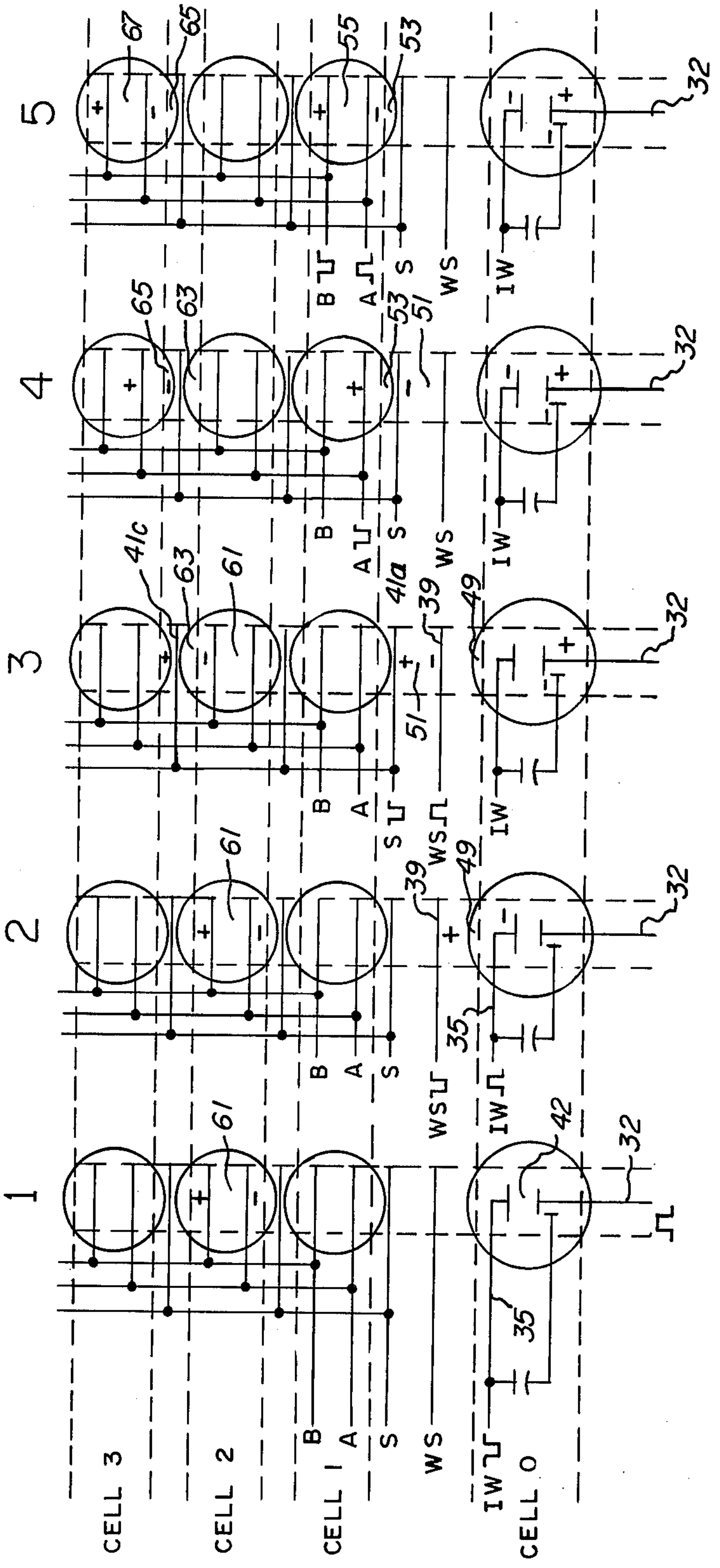
FIG. 6 is a diagrammatic view of a single conductor line, showing the cell states at several of the time slots during the WRITE operational mode.

As is summarized above, the process of writing display information on the visual information screen is carried on in a time sequence over the five time slots of the WRITE mode of operation. During each of these WRITE mode time slots a cell ignition is shifted one step to an adjacent cell area, and a new binary "1" or "0" is inputted into cell 0 via an input data line (ID). For purposes of example, FIG. 6 illustrates the writing of the binary pattern 1010 into the line of gas cells associated with input conductor 32. The shifting of this binary pattern is illustrated through each of the five time slots of the WRITE mode, beginning with the assumption that the first binary "1" has previously been entered via conductor 32 and is located in cell #2 in the form of cell ignition in region 61, and a binary "0" is represented in cell #1 as an unignited cell. The (+) and (−) signs shown on FIG. 6 are representative of the respective internal gas cell voltage charges which develop along the interior dielectric surfaces as a result of the voltages being applied to adjacent conductors.

At time slot 1 the second binary "1" is entered into the cell #0 position. To accomplish this the ID signal on conductor 32 is controllably driven to the +V volt potential and the IW signal on conductor 35 is driven to the 0 volt potential. This potential difference across cell region 42 causes ignition of the gas. At time slot 2 the WS signal on conductor 39 is driven to a 0 volt potential and the IW signal on conductor 35 is driven to a +V volt potential, causing the ignition to shift from region 42 to region 49. At time slot 3 the S signal on conductor 41*a* is driven to the 0 volt potential and the WS signal on conductor 39 is driven to the +V volt potential. This causes ignition to shift from region 49 to region 51. The S signal is also applied to a conductor 41*c* intermediate cell #2 and cell #3 causing the ignition to shift from region 61 to region 63.

At time slot 4 the S signal applied to conductor 41*a,* 41*b,* etc. returns to +V volts and the A signal applied to all A conductors is driven to 0 volts. This causes the respective ignition to shift from region 63 to region 65, and from region 51 to region 53. Cell #0, having been ignited at time slot 3, remains ignited during time slots 4 and 5.

At time slot 5 the A signal applied to all A signal conductors returns to +V volts and the B signal applied to all B signal conductors is driven to the 0 volt potential. This causes the respective ignitions to shift from region 65 to region 67, and from region 53 to region 55. Since region 55 corresonds to the center area of cell #1 and region 67 corresponds to the center area of cell #3, the cycle is completed with cell #1 and #3 ignited and cell #2 unignited, indicative of a binary 101 data condition.

After time slot 5 the WRITE mode is terminated and one of two timing sequences is initiated. If no further information is to be entered into the visual information screen, the STORE mode is begun and continued thereafter until such time as new information is to be entered. If additional information is to be entered, the WRITE mode is reinitiated with a new voltage potential applied to input conductor 32. If this new voltage potential is at 0 volts the next binary data entered into the line of cells will be a "0"; if the voltage is +V volts the next binary data will be a "1". In this manner the inputting of binary ones and zeros will be selectively controlled so as to create a shifted pattern of cell ignitions and unignited cells across the entire line of cells adjacent input conductor 32. Similarly, binary data can be entered into each of the other input conductors and shifted across the visual information screen to form a desired alphanumeric pattern on the visual information screen. Once written on the screen, the pattern will remain for so long as the STORE mode of operation is repeated. To change any portion of the pattern it is necessary to proceed through a predetermined number of WRITE mode sequences until such time as the new pattern has been shifted entirely across the screen.

STORE MODE OF OPERATION

Figure 7:
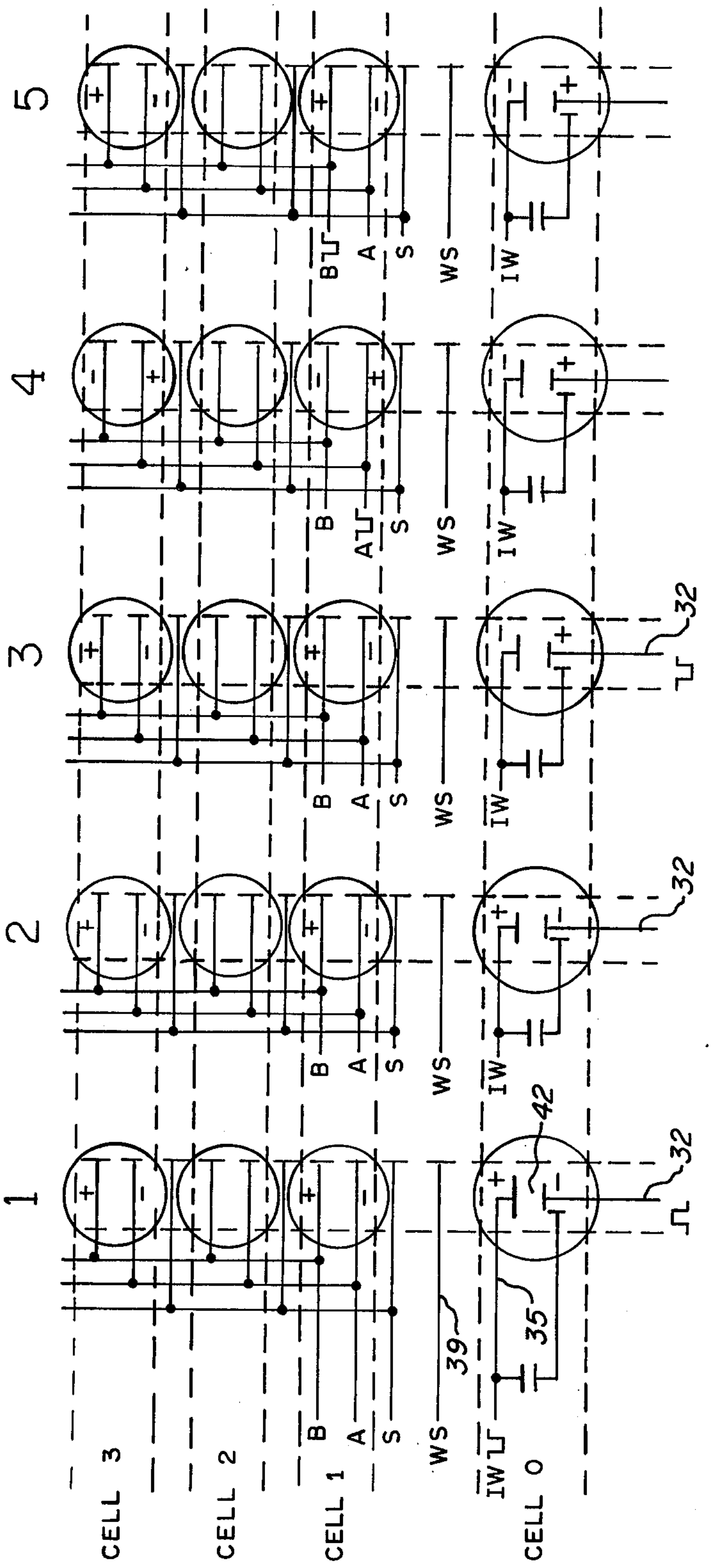
FIG. 7 is a diagrammatic view showing the cell states at each of the time slots during the STORE mode of operation.

FIG. 7 illustrates symbolically, in the same manner as FIG. 6, the electrical field charges which occur during each time slot in the STORE mode of operation for a particular input line, as for example input line 32 of FIG. 3. Three typical gas cells are illustrated in FIG. 7 and the elctrical field effects are shown for these cells and the panel edge cell (cell 0) for each of the first five distinct time slots comprising the first half of the STORE mode of operation. The electrical fields within these cells do not change from the arrangement shown for time slot 5 during the last half of the STORE mode of operation.

For purposes of understanding FIG. 7, it can be assumed that at time slot 1 cell #0, cell #1, and cell #3 are all ignited, and cell #2 is unignited. Further, it can be assumed that the respective internal cell dielectric voltage charges are as shown by the (+) and (−) signs on FIG. 7.

Each of the cells 1, 2, 3, and all subsequent cells in the visual display screen are defined by two conductor lines. One of these lines is electrically coupled to the source generating the A signal and the other line is electrically coupled to the source generating the B signal. The relative timing of these signals can be seen in FIG. 2, which shows the A signal to be 0 volts during time slot 4 and +V volts at all other times. Similarly, the B signal is 0 volts during time slot 5 and +V volts at all other times.

As has been previously described, one of the electrical and gas discharge characteristics of the present apparatus is that an ignition previously triggered may be sustained for a period longer than the ten time slots herein described, even when the two cell conductor lines are returned to the same voltage polarity, but that the cell ignition will eventually decay and extinguish if not periodically refreshed by applying a predetermined minimum voltage across the cell conductors. The magnitude of the voltage difference across the conductor lines necessary to sustain ignition is less than that required to initially ignite the cell. Conversely, if the cell is initially unignited the application of the voltage difference necessary to sustain (STORE) ignition will be insufficient to ignite the cell.

Referring to FIG. 2, it can be seen that there are only two time slots during the STORE mode of operation where a voltage difference exists between the cell conductor line signals A and B. During time slot 4 the A signal drops to 0 volts and the B signal remains at +V volts. This voltage difference, when applied to a cell which was already ignited, is sufficient to cause the ignition to be sustained. At time slot 5 the A signal returns to +V volts and the B signal drops to 0 volts to continue sustaining the ignition of the cell.

Referring to FIG. 7, and examining the ionization state of cell #3 over each of the time slots 1–5, it must be assumed that cell #3 was ignited during some previous WRITE mode of operation and that the internal cell dielectric charges remain in the cell during time slots 1–3. At time slot 4 the 0 volt A signal, together with the voltage-aid internal cell electric charges, causes a cell ignition in the reversed-polarity direction. At time slot 5 the 0 volt B signal causes another reversal of voltage polarity and a cell reignition as a result of that polarity reversal. The internal cell voltage charges remain on the respective dielectric surfaces until the next periodic application of A and B signals.

Referring to FIG. 7, and examining the ionization state of cell #2 over each of the time slots 1–5, it is to be assumed that the internal cell dielectric initially has no net voltage charge. It remains in that condition during time slots 1–3, and the 0 volt A signal which occurs at time slot 4 provides insufficient ionization energy to cause ignition, because there is no internal cell voltage-aiding effect to provide the necessary ignition conditions. Similarly, the 0 volt B signal during time slot 5 is insufficient to cause cell ignition. Therefore, the cell remains unignited during the entire STORE mode of operation.

Cell #1 is initially ignited and therefore has the same sequential ionization states as cell #3, herein described.

Cell #0 is the edge cell on the visual information screen, normally hidden from operator view by an opaque edge strip, but which is always held in the ignition state except when a binary "0" is to be entered into the line of cells associated with a particular cell #0 line position. At time slot 1 an IW signal of 0 volts is applied to conductor 35, and an ID signal of +V volts is applied to conductor 32. This sudden voltage polarity change on both conductors 35 and 32 is sufficient to cause ignition in cell #0. At time slot 2 the IW signal applied to conductor 35 returns to +V volts, leaving both conductors 35 and 32 at a +V volt potential. At time slot 3 the ID signal applied to conductor 32 returns to a 0 volt potential, and the cell reignites in a reversal voltage polarity sense. The internal cell dielectric voltage charge remains as shown in time slot 3 throughout the remainder of the store cycle.

Figure 8:
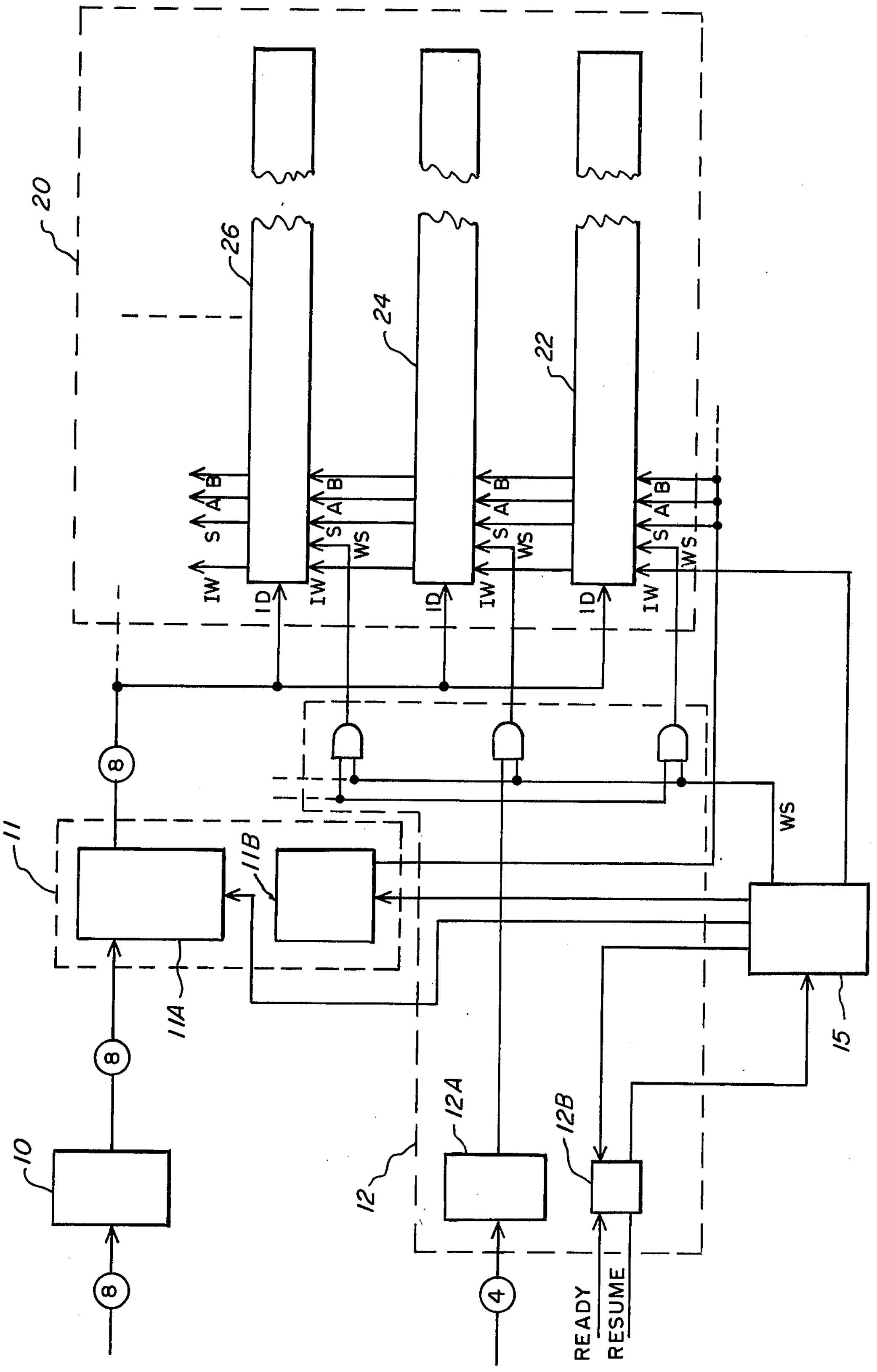
FIG. 8 is a block diagram showing signal interconnections to the apparatus.

FIG. 8 is a block diagram showing an expanded view of the interconnection to the visual information screen 20. Buffer register 10 receives a plurality of parallel binary signals from a digital computer or other signal source. In the preferred embodiment buffer register 10 receives 8 binary bits in parallel, although any other parallel combination of binary bits can equally well be adapted to the present invention. These binary bits are transferred to the display drive control network 11, and more specifically to an input data driver network 11A, where they activate circuits which are connected to the input data (ID) lines on visual information screen 20. The timing of this information transfer is controlled by timing logic 15, which generates signals in timed coincidence with the ID signal shown on FIG. 2.

Visual information screen 20 is organized into a plurality of alphanumeric lines 22, 24, 26, etc. Each alphanumeric line comprises 8 cellular lines of the type shown in FIG. 3, and is therefore associated with 8 input data bits. This architectural organization is convenient for the display of alphanumeric information, although visual information screen 20 could as easily be architecturally arranged in any other convenient pattern. Each of the alphanumeric lines, for example line 22, receives 8 binary signals on 8 ID conductors. In addition, each alphanumeric line receives all of the other signals shown on the timing chart of FIG. 2. The IW, S, A, and B signals are parallel connected to all alphanumeric lines. The WS signal is connected to each alphanumeric line through control logic network 12, which therefore serves as an address selection circuit for determining which of the plurality of alphanumeric lines is to be selected for any given write cycle.

Control logic network 12 includes a line address register 12A which receives a plurality of binary bits from an address selection source such as the computer. In the preferred embodiment 4 binary bits are used to select one of 16 alphanumeric lines.

Control network 12 also contains circuitry 12B for controlling timing logic 15 in response to signals from a computer or other driving source. Whenever the driving source is prepared to transmit binary data to the visual information screen it activates a "ready" line. Circuitry 12B responds by commanding timing logic 15 to execute a write cycle, in synchronized communication with data transmitted through buffer rigister 10. As soon as the write cycle has been completed circuitry 12B generates a signal over the "resume" line to indicate to the driving source that the data has been entered into the visual information screen. Whenever data is not being entered into the visual information screen, circuitry 12B controls the timing logic 15 to repetitively execute store cycles, so that visual information screen 20 continually receives the timing signals representative of the store cycle in FIG. 2. This continuous repetition ensures that binary data displayed on the screen is retained there.

If a succession of binary or alphanumeric data is to be stored on any of the alphanumeric lines of the visual information screen, the driving source repetitively activates the timing write cycle to consecutively shift alphanumeric or binary information across the visual information screen. Each time new binary or alphanumeric data is entered into the left side of the screen via the ID inputs the information which was therefore displayed by the screen becomes shifted rightward. Thus, the driving source can not only write new information on the visual information screen but can also shift information previously stored to the right by any desired increment.

If information displayed on the screen is to be modified in any way, it is necessary to enter new information across the entire alphanumeric line, which new information contains the modification desired. Since the preferred embodiment uses the principle of timeshifting, it is not possible to selectively modify information displayed on a portion of an alphanumeric line without replacing the entire line. However, since the display information is typically stored in the digital computer or other driving source it is a relatively simple technique to recall such information, modify it and activate the necessary control cycles to rewrite an alphanumeric line on the visual information screen.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A system and apparatus for providing a visual display of information by selective ignition of regions of inert gas in parallel aligned gas channels by electrical energization of perpendicularly aligned spaced conductors, comprising:

a. a plurality of first input conductors, each of said input conductors positioned adjacent a gas channel end region;

b. a plurality of second conductor surfaces, each of said surfaces positioned intermediate a pair of gas channels and having a portion of said conductor surface projecting into adjacent gas channel regions, said second conductor surfaces being joined together into at least one electrically continuous conductor by conductor segments which bridge the gas channel regions between said surfaces;

c. a dielectric layer separating said gas channels from all of said perpendicularly aligned spaced conductors, said plurality of first input conductors, and said plurality of second conductor surfaces and conductor segments;

d. means for voltage-energizing each of said first input conductors; and e. means for selectively and time sequentially voltage-energizing said electrically continuous conductors and said perpendicularly aligned spaced conductors.

2. The apparatus of claim 1, wherein said first input conductors each further comprise an end surface approximately spaced equidistant from adjacent second conductor surfaces and a greater distance from said conductor segment bridging said gas channel region.

3. The apparatus of claim 2, wherein the gas channel facing area of said input conductor end surface is approximately equal the sum of the gas channel facing areas of the adjacent second conductor surfaces.

4. The apparatus of claim 3, wherein the gas channel facing area of said conductor segment bridging said gas channel region is approximately no greater than about 10% of said input conductor end surface gas channel facing area.

5. The apparatus of claim 4, wherein all conductors and conductor segments occupy the same planar level in a glass body.

6. The apparatus of claim 5, wherein said gas channels are formed from grooves in a glass plate which overlays said glass body.

7. The apparatus of claim 6, wherein said dielectric layer further comprises a glass layer intermediate said glass body and said glass plate.

8. The apparatus of claim 7, wherein said means for voltage-energizing each of said first input conductors is time synchronized with said means for selectively and time sequentially voltage-energizing said electrically continuous conductors and said aligned spaced conductors.

9. The apparatus of claim 8, wherein all of said means for voltage-energizing further comprise bi-level voltage devices which generate two voltage level signals.

10. The apparatus of claim 9, further comprising frequency means for generating clock signals, coupled to said means for voltage-energizing.

11. The apparatus of claim 10, wherein said frequency means generates clock signals at a frequency of from 5 kHz to 100 kHz.

12. A visual display panel of the type formed from a matrix of gas cell regions which are selectively illuminable by application of voltages to conductors closely positioned to said gas cell regions, comprising:

a. a flat glass panel having a plurality of parallel spaced grooves therein;

b. a thin glass layer overlaying said grooved panel surface;

c. a flat glass panel having a plurality of parallel spaced conductors therein and a parallel spaced edge conductor having a plurality of spaced perpendicular tabs projecting therefrom toward said panel edge, and a plurality of input conductor pads projecting inwardly from said panel edge and terminating intermediate respective ones of said perpendicular tabs, said panel conductors facing said thin glass layer with said plurality of spaced conductors perpendicularly aligned relative to said parallel spaced grooves and said input conductor pads aligned with said grooves; and d. an inert gas supply source and means for coupling said inert gas to said parallel spaced grooves.

13. The apparatus of claim 12, further comprising bilevel voltage means for selectively introducing voltages to said input conductor pads.

14. The apparatus of claim 13, further comprising bilevel voltage means for selectively and sequentially introducing voltages to said parallel spaced conductors and said parallel spaced edge conductors.

15. The apparatus of claim 14, wherein said perpendicular tabs further comprise a conductor surface of width greater than the distance between parallel spaced grooves.

16. The apparatus of claim 15, wherein said input conductor pads are positioned closer to said perpendicular tabs than to said parallel spaced edge conductor.

17. The apparatus of claim 16, wherein the edges of adjacent perpendicular tabs are partially aligned within a groove and the intermediate input conductor pad is wholly aligned within the groove, and the groove facing area of said pad is approximately equal to the sum of the groove facing areas of said tab edges.

18. The apparatus of claim 17, wherein the portion of the parallel spaced edge conductor aligned within a perpendicular groove has a groove facing surface area approximately 1/10 the groove facing surface area of an input conductor pad.

19. The apparatus of claim 16, wherein said conductor pads and said perpendicular tabs occupy the same planar level in said flat glass panel.

20. The apparatus of claim 19, wherein said plurality of spaced conductors and said parallel spaced edge conductor occupy the same planar level in said flat glass panel.

21. The apparatus of claim 14, further comprising frequency means for generating clock signals, coupled to said bi-level voltage means.

22. The apparatus of claim 21, wherein said frequency means generates clock signals at a frequency of from 5 kHz to 100 kHz.

23. In a gas display panel of the type having parallel planar conductors and mutually perpendicular gas channels separated therefrom by dielectric material to form a matrix of gas cell regions, the improvement in data input and edge pilot cell construction comprising:

a. a plurality of input conductors spaced along an edge of said gas display panel, said input conductors each inwardly terminating in an expanded conductor surface area separated from said gas channel by dielectric material; and b. a second conductor perpendicularly aligned with said input conductors and separated from said gas channel by dielectric material, said second conductor having a plurality of conductor pads projecting therefrom intermediate respective ones of said expanded conductor surface areas.

24. The apparatus of claim 23, wherein said plurality of input conductors are respectively aligned adjacent gas channels, and each of said plurality of conductor pads are aligned intermediate gas channels with edge surfaces projecting into adjacent alignment with gas channels.

25. The apparatus of claim 24, wherein the gas channel facing surface area of said input conductors is approximately equal to the gas channel facing areas of said conductor pad edge surfaces.

26. The apparatus of claim 25, wherein the gas channel facing surface area of said input conductors is at least about 10 times the gas channel facing surface area of said second conductor less said conductor pads.

27. The apparatus of claim 26, wherein said plurality of input conductors and said second conductor are positioned in a common plane in said gas display panel.

28. The apparatus of claim 27, wherein said input conductor expanded conductor surface area is closer-shaped to said conductor pad edge surfaces than to said perpendicular second conductor portion.

* * * * *